Patented May 17, 1938

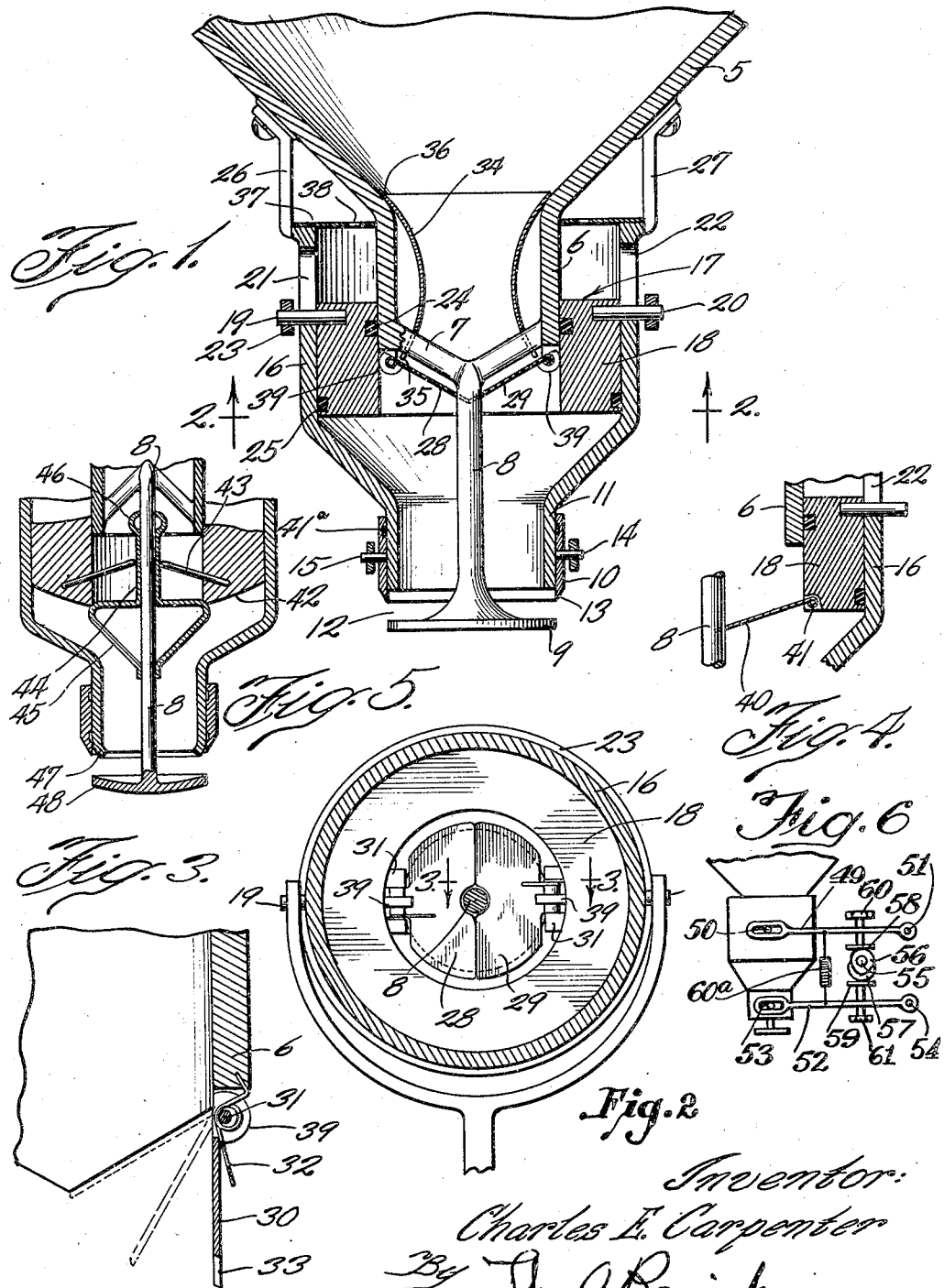

2,117,399

UNITED STATES PATENT OFFICE 2,117,399

DOUGH BATCH CUTTER AND THE LIKE

Charles E. Carpenter, Chicago, Ill.

Application May 27, 1936, Serial No. 82,111

13 Claims. (Cl. 107—14)

This invention relates to improvements in dough batch cutters and the like, and has particular reference to improvements in such cutters intended for use in the making of doughnuts. It will be seen that devices embodying the present features may be used for forming batches of dough for other purposes than the making of doughnuts, but inasmuch as said features have been devised with particular reference to doughnut making, I shall refer particularly to such use, but in so doing I wish it understood that I do not intend thereby to limit the usefulness of the invention, except as I may do so in the claims.

One object of the invention is to provide a device which is so constructed that the dough will be drawn from the hopper in a very positive manner, and under definite control so that the amount thereof presented for delivery to the delivery throat will be correct according to the size of the doughnut being formed. In this connection it is a further object to so arrange the parts that the amount of dough which will be so drawn from the hopper may be regulated from time to time so that variations in the doughnut size may be readily effected.

A further feature of the invention is to provide an arrangement such that during the delivery operation in which the dough is delivered to the throat the delivery force will be exerted in a very direct manner and directly towards the throat, so that the dough will move into and through the throat smoothly, and positively, and with a minimum amount of disturbance to the dough itself during this operation. In other words, it is an object to provide an arrangement such that during the operations of drawing the dough from the hopper, and thereafter delivery to the throat, the movement of the dough will be practically unidirectional, and in the general direction of the throat; thereby also reducing the disturbance to the dough as much as possible, and practically eliminating "kneading" of the dough during these movements.

A further feature of the invention is to provide an arrangement such that the forces exerted on the dough will be created around a substantially complete circle or ring around the axis of the throat, so that all of the forces of drawing the dough from the hopper, and thereafter delivering the dough to and through the throat will be uniformly exerted around the axis, thereby resulting in a more perfect control of the dough moving operations, and the formation of a more perfect doughnut.

The above objects are secured by the provision of an arrangement in which there is a circular or ring shaped piston located around the axis of the device, which ring shaped piston moves up and down parallel to the axis. This results in the creation of dough moving forces which are parallel to the axis, and which are created of uniform amount around the entire circle.

In connection with the foregoing, it is a further object to provide a simple piston ring arrangement for sealing the piston surfaces against the ring shaped cylinder in which the piston moves and works; such piston rings being in the form of rubber or similar gaskets located in suitable grooves in the piston surfaces, and which rubber gaskets are placed under compression when the piston is inserted into the cylinder.

A further object is to provide a simple form of valve arrangement for preventing the backward movement of the dough towards the hopper when the piston is moved downwardly during the delivering operation. In this connection, the natural tendency is for the dough to move downwardly into the throat during the delivering operation, since the piston movement is parallel to the throat axis, so that the tendency of the dough to move backwardly towards the hopper is minimized; but these simple valves will effectively resist any such backward movement tendency, and ensure full and complete delivery of the intended quantity of dough into and through the throat. These valves are so arranged that they naturally tend to move to the closed position during the delivery operation, and also they interfere with the movement of the dough from the hopper to a minimum degree.

A further feature of the invention relates to the provision of a form of tapered or contracted passage from the hopper towards the throat, so that during the movement of the dough from the hopper there will be a natural tendency for the dough to make the necessary movements induced by the movements of the piston. This form of passage may be secured by the use of a removable ring shaped insert of sheet metal, inserted into the passage from above, that is, from the hopper, and such sheet metal insert may be used or may be dispensed with as desired, by merely drawing it upwardly through the hopper.

Another object is to provide an arrangement such that the necessary driving connections to the piston and to the cut-off ring may be easily effected, entirely from the outside of the device, and without any connections upwardly through the hopper itself.

Other objects and uses of the invention will appear from a detailed description of the same, which consists in the features of construction, and combinations of parts hereinafter described and claimed.

In the drawing;

Figure 1 shows a vertical section through the lower portion of the hopper, and through the piston and associated parts, and through the throat and cut-off ring and perforating ring, the piston being in its lowermost position, and the valves being closed, preparatory to an upward movement of the piston for drawing in a new batch of dough;

Figure 2 shows a cross-section on the line 2—2 of Figure 1 looking in the direction of the arrows; and Figure 3 shows on somewhat enlarged scale a fragmentary detail of the valve at one side of the passage, being shown in open position by full lines, and in closed position by dotted lines; and Figure 4 shows a fragmentary view of the modification; Figure 5 shows another modification, and Figure 6 shows on small scale a side elevation of the device, showing the connections for operating the cut-off ring and the piston or plunger in timed relationship.

Referring to the figures, the lower portion of the hopper is designated by the numeral 5. It is provided with a downward extension or passage 6 of circular form through which the dough moves during the feeding operations. A bracket 7 is secured to the lower portion of this extension and carries a downwardly extending rod 8, to the lower end of which is connected the die 9. A cut-off ring 10 works on the throat 11, presently to be described, and when this ring is moved down it seals the annular opening 12 between the lower end of the throat and the die 9, and the lower cutting end 13 of this ring then co-operates with the die 9 to cut off the dough batch in the well understood manner. The ring 10 may be moved up and down in any convenient manner by the pins 14 and 15.

The throat 11 constitutes the lower downwardly extending portion of a circular cylinder member 16 which surrounds the passage 6, and is spaced therefrom to provide the annular cylindrical chamber 17 within which is located and works the annular piston member 18. This piston member 18 is operated up and down by means of the pins 19 and 20 which reach out through the vertical slots 21 and 22 in the cylinder member 16, and the operating ring 23 outside of the member 16 connects to these pins, so that by moving this ring up and down the piston itself is also reciprocated up and down. It will be noted that the vertical dimension of the annular piston as compared with its maximum amount of travel is such that the lower portions of the slots 21 and 22 never come into communication with the space beneath the piston 18, and also the upper end of the annular piston never travels below the lower end of the passage 6. There is always a proper amount of lap between all of these parts.

Preferably, there is provided a piston ring 24 on the inner face of the annular piston, and near its upper end, which piston ring travels against the outside face of the passage 6; and there is provided a piston ring 25 on the outer face of the annular piston, and near its lower end, which piston ring travels against the inside face of the cylinder member 16. These piston rings are conveniently formed as rings or gaskets of rubber set into grooves formed in the inner and outer faces of the annular piston, and which rubber rings are placed under compression when the annular piston is set into place between the passage 6 and the cylinder member 16. Preferably also, the travel of the annular piston never causes the ring 25 to ride up to the positions of the slots 21 and 22.

The cylinder member 16 is conveniently connected to the lower portion of the hopper by means of the brackets 26 and 27, so that if desired the annular cylinder assembly may be readily set into place or removed from the hopper, by merely removing the die 9 from the lower end of the rod 8.

There are provided the valve members 28 and 29 at the lower end of the passage 6. One of these valves is shown in detail in Figure 3. It is formed of a sheet metal plate 30 having a central hinge 31 which is pivotally connected to the lower end of the passage 6 so that the valve can either lie flat against the lower end of the passage 6, being the closed valve position, or the valve can swing down into a substantially vertical position, being the fully opened position. A light spring 32 may be provided for assisting the valve closing movements. It will also be noted that the central portion of the edge of each of the valve members is notched as at 33 to receive the rod 8 when the valves are closed, thereby permitting both of the valves to come together edge to edge for effecting a full closing movement.

It may also be noted that the lower end of the passage 6 is preferably cut or formed on a double taper so that when the valves move to the closed position they come flat against the lower edge of said passage to effect an effective seal thereagainst.

If desired, a sheet metal insert 34 may be set down into the passage 6, said insert being so formed as to provide a tapered passage therethrough, with its lower end rounded as well shown at 35. This will in some cases improve the delivery of the dough from the passage into the space beneath the piston, and towards the throat 11. Such insert may have its upper end 36 slightly enlarged so as to lie against the lower edge of the hopper to thereby provide a support for the insert, and to permit the insert to be set into place or removed through the hopper. In some cases this insert may be dispensed with. It will be noted, however, that when it is used it covers over the connecting ends of the bracket 7, and thus prevents the dough from getting into direct contact therewith; and the lower edge portion of the insert should be notched to permit it to be set into place or removed from the passage 6.

It is to be noted that during operation, the rings 10 and 23 are driven in proper timed relationship by any suitable mechanism. Such timing should be so carried out that during the down movement of the annular piston the ring 10 is raised to open the annular delivery orifice, and permit the dough batch to be delivered. During this operation, also, the valves 28 and 29 are closed, to prevent the back movement of the dough into the passage 6. During the up movement of the annular piston, the ring 10 should be in its lowered position, wherein the annular delivery opening is closed, and this lowered position also ensures the cut-off of the dough batch previously delivered through the annular opening. Under these conditions, the up movement of the annular piston will create a partial vacuum in the space within the throat 11, and a fresh quantity of dough will be drawn from the passage 6, past the valves 28 and 29. When the next succeeding down movement of the annular piston occurs a fresh batch of dough will be forced out, etc. It will also be noted that the size or quantity of the dough batch may be regulated by the piston stroke, which result may be readily provided for in the operating mechanism.

While I have herein disclosed only a single embodiment of the features of my present invention, still I do not intend to limit myself thereto, except as I may do so in the claims.

If desired a plate 37 may be placed over the upper end of the cylindrical annular cylinder 17 to enclose the same and protect against the entrance of dust and dirt, and to generally protect the same; and in such case said plate may be provided with vent openings 38 to prevent the accumulation of pressure within the annular cylinder above the annular piston during the upward movements of the piston.

Referring again to the valves 28 and 29, it is to be noted that in order to ensure accurate control of the quantity of dough which will be delivered, the back movement of dough towards or into the passageway 6 should be effectively prevented, and therefore the valves should close at the beginning of the downward stroke of the annular piston. In order to assist the force of the springs 32 I have shown the friction disks 39 on the pivoted ends of the valves, which friction disks bear against the inner face of the lower portion of the annular piston 18. The result of this arrangement is that when the annular piston commences its downward movement the first portion of such movement will tend to positively close the valves, and as soon as they have been closed the further downward movement of the piston will result in a slippage of the same with respect to the disks 39, the valves remaining closed. Conversely, when the upward movement of the annular piston commences the engagement of the disks 39 with the annular piston will ensure prompt opening of the valves, and the continued upward movement of the piston will retain the valves in open condition until the upward movement ceases. It is to be noted, also, that the movement of the dough through and out of the passageway 6 will also assist in causing the valve movements, but without supplemental means, such as the springs 32 or the friction disks 39 there might be an excessive amount of return of dough to the passageway.

In Figure 4 I have shown a modified arrangement in which the valves are pivotally mounted on the annular piston itself, so that the valves travel up and down with the piston. Thus, the valve 40 is shown pivoted on the piston at the point 41, a suitable recess or notch being formed in the edge portion of the piston to receive such pivotal connection. The arrangement is such that the full upward movement of the piston may be accomplished without interference between the valve and the lower portion of the passageway. With this arrangement the valves constitute in effect a portion of the piston, and they consequently assist the downward drive of the dough during the downward movement.

Referring again to the piston rings 24 and 25, these may be of rubber or any suitable material, such as soft metal, etc. It is also desirable to place similar piston rings, such as 41ª on the cut off sleeve 10, so as to ensure air-tightness of the same with the throat 11. With such arrangement it will be seen that leakage of air into the device during the suction or upward movement of the annular piston is effectively prevented (the only joint not protected by piston rings being the contact of the ring 10 with the disk 9, and this being sealed in air tight manner by the presence of the dough), so that the tendency to form air bubbles is practically eliminated.

In connection with the foregoing it is to be noted that I have provided an arrangement in which there is a vacuum chamber between the passageway 6 through which the dough is being drawn, and the throat 11 through which the dough is being delivered, all said parts being in alignment with each other, and the vacuum chamber being directly beneath the passageway 6; this arrangement also being conducive to the prevention of formation of air bubbles in the dough.

It is also intended that the bracket arms 7 may be streamlined in order to ease the flow of the dough past said arms, and thus further reduce the tendency to formation of air bubbles in the dough.

It is to be noted that the arrangement herein disclosed is one in which the passageway 6 and the annular cylinder 17 are concentric, the delivery throat being in alignment therewith, and the suction and pressure chamber also being in alignment with said parts, and located between the delivery throat and the concentric elements aforesaid. Sometimes the relationship of the passageway and the annular cylinder may be reversed, the cylinder being located inside of the passageway instead of outside thereof. In such case, however, the concentricity of the parts is maintained, and also the alignment thereof with the delivery throat.

In the modified arrangement shown in Figure 5 the plunger 42 carries the bracket 43 which rides up and down with said plunger or piston 42, and serves as a supplemental support for the rod 8, to support it against lateral displacement and may also be streamlined. On the rod 8 is slidably mounted the tubular stem 44, having at its lower end the enlarged valve 45 of proper size to seal and close the central passageway through the plunger at the proper time. Said stem 44 is provided with a stop at its upper end, 46, so that at the proper time on the up stroke the valve will be taken and carried up with the plunger movement. With this arrangement, when the down movement of the plunger or piston commences the stem or sleeve 44 will slip on or with respect to the bracket 43 until the valve closes the opening at the lower end of the passageway, after which further downward movement of the plunger will occur with the valve closed, so that proper delivery of the dough from the throat will be ensured. When the plunger or piston commences its upward movement from the lower extreme, the sleeve 44 and valve 45 will lag behind the plunger or piston movement until the bracket 43 again engages the enlargement 46, whereupon the sleeve and valve will be drawn up with the plunger to the limit of upward movement, dough being delivered past the valve during this movement. It will be seen that with this arrangement the valve travels with the plunger or piston, and the opening and closing movements of the valve are very definitely and positively ensured.

In this modified arrangement I have also shown the lower end of the throat 47 as being slightly contracted, and I have also shown the die or disk 48 as being concave upwards. As a consequence, the flow of the dough is so controlled that a better form of dough batch is ensured; and such action is further enhanced by forming the valve 45 somewhat on a streamline contour as shown in the drawings.

Referring to Figure 6, the pins 19 and 20 on the cylinder piston 18 are connected to the yoke 49, by the slots 50, said yoke being pivoted at 51. Likewise the pins 14 and 15 of the cut off sleeve 10 are connected to the yoke 52 by the slots 53, said yoke being pivoted at 54. The drive shaft 55 carries the cams 56 and 57 for the yokes 49 and 52 respectively, and there are the plates 58 and 59 connected to the yokes by the adjustment screws 60 and 61 so that the said plates may be adjusted to vary the positions of the yokes when the cams are at their extremes of movement. Also the plates 58 and 59 are offset on the yokes so that the one plate for the cam 56 will not contact with the cam 57, and vice versa. The adjustment of the plates by the screws makes it possible to vary the operations so that the sizes of the dough batches may be adjusted. A spring 60ᵃ connects the yokes together so that they are kept in proper contact with their respective cams.

It will be seen that with this arrangement the rod 8 is given additional lateral support so that its stiffness may be enhanced, or conversely, a smaller rod may be used and still secure the needed stiffness thereof.

I claim:

1. A dough batch feeder for the purpose specified comprising in combination an element having a vertical cylindrical passageway, a cylinder member surrounding said passageway and spaced therefrom to provide an annular cylinder between said parts, said cylinder member extending to a position beneath the passageway and providing a downwardly extending delivery throat in alignment with the passageway, a stem extending axially through said throat and having its upper end connected to the lower portion of the passageway, a die disk on the lower end of the stem, valve members located in operative relationship with respect to the lower end of the passageway, and movable downwards to permit downflow of dough from the passageway, an annular piston located in the annular cylinder aforesaid, and movable vertically therein, a cut-off ring located on the throat and movable vertically thereon, and co-operating with the die disk to open and close an annular delivery opening and cut off dough batches, together with means to move the annular piston and the cut-off ring vertically in timed relationship, substantially as described.

2. A dough batch feeder for the purpose specified comprising in combination an element having a vertical cylindrical passageway, a cylinder member surrounding said passageway and spaced therefrom to provide an annular cylinder between said parts, said cylinder member extending to a position beneath the passageway and providing a downwardly extending delivery throat in alignment with the passageway, a die disk located beneath the lower end of the delivery throat and in alignment therewith, valve members located in operative relationship with respect to the lower end of the passageway, and movable downwards to permit downflow of dough from the passageway, an annular piston located in the annular cylinder aforesaid, and movable vertically therein, a cut-off ring located on the lower portion of the throat and movable vertically thereon, and co-operating with the die disk to open and close an annular delivery opening and cut off dough batches, together with means to move the annular piston and the cut-off ring vertically in timed relationship, substantially as described.

3. A dough batch feeder for the purpose specified comprising in combination aligned members having a passageway and a delivery throat, said members being separated from each other, an annular cylinder surrounding the passageway, an annular piston located within said annular cylinder and vertically reciprocable therein, a die disk located beneath the delivery end of the throat and separated therefrom to provide an annular delivery orifice, a cut-off ring working on the lower end of the throat to open and close said delivery orifice and cut off dough batches with respect to the die disk, valve members located at the lower end of the passageway, together with means to reciprocate the annular piston and the cut-off ring in timed relationship, substantially as described.

4. A dough batch feeder for the purpose specified comprising in combination aligned members having a passageway and a delivery throat, said members being separated from each other, an annular cylinder surrounding the passageway, an annular piston located within said annular cylinder and vertically reciprocable therein, a die disk located beneath the delivery end of the throat and separated therefrom to provide an annular delivery orifice, a cut-off ring working on the lower end of the throat and separated therefrom to provide means to cut off dough batches and seal and unseal the delivery orifice, together with means to reciprocate the annular piston and the cut off ring in timed relationship, substantially as described.

5. Means for feeding dough batches comprising in combination an element having a passageway through which the dough travels, valve means in conjunction with the lower end of said passageway to prevent back movement of the dough into the passageway, a stationary throat in alignment with the passageway, movable means surrounding the passageway and of higher elevation than the throat to periodically create a suction around the delivery end of the passageway and beneath the valve means, said suction being uniform around the passageway, and means to cut off batches of dough, substantially as described.

6. Means for feeding dough batches comprising in combination an element having a passageway through which the dough travels, valve means in conjunction with the lower end of said passageway to prevent back movement of the dough into the passageway, a stationary throat in alignment with the passageway, movable means to create a suction around the delivery end of the passageway and beneath the valve means, said suction being uniform around the passageway, together with means to cut off batches of dough, substantially as described.

7. Means for feeding dough batches and the like which are of moderate consistency, comprising an element having a passageway through which the dough travels, a throat in alignment with the passageway, valve means at the delivery end of the passageway, and movable to an open position substantially parallel to the axis of the passageway, means to create a suction of substantially uniform amount around the passageway, together with means to cut off dough batches, substantially as described.

8. Means for feeding batches of dough comprising in combination an element having a passageway through which the dough travels, together with an annular cylinder surrounding said element and passageway, a throat in alignment with the passageway, an annular piston in the annular cylinder, valve means between the delivery end of the passageway and the annular cylinder, together with means to reciprocate the annular piston, whereby there is produced by the piston movements a substantially uniform vacuum around the entire delivery end of the passageway, substantially as described.

9. In a dough batch feeder, the combination of an element having a dough supply passageway through which the dough is drawn, a stationary dough delivery throat in alignment with said passageway and separated therefrom to establish a circular chamber in connection with said parts, said chamber completely encircling the adjoining portions of said passageway and said throat, together with means to alternately create suction and pressure in said chamber, substantially as described.

10. In a dough batch feeder, the combination of an element having a dough supply passageway through which the dough is drawn, a stationary dough delivery throat in alignment with said passageway and separated therefrom to establish a circular chamber at that point, said chamber completely encircling the adjoining portions of the said parts, together with means to establish suction and pressure alternately in said chamber, and in varying and regulated degree to thereby regulate the size of the doughnuts or batches of dough drawn from the passageway and delivered to the throat, substantially as described.

11. Means for forming dough batches and the like, comprising in combination an element having a passageway through which the dough is drawn, an annular cylinder encircling said passageway, an annular piston in said cylinder, valves for controlling the lower end of said passageway, a stationary delivery throat in position to receive and deliver dough batches, together with a mechanical connection between said piston and said valves effectively to ensure prompt closing and opening movements of the valves with the piston movements, substantially as described.

12. Means for forming dough batches and the like, comprising in combination an element having a passageway through which the dough is drawn, an annular cylinder encircling said passageway, an annular piston in said cylinder, a stationary throat in position to receive and deliver dough batches, and valves mounted on the annular piston and travelling therewith, effectively to seal against backflow of dough into the passageway during downward movements of the piston, substantially as described.

13. Means for forming and delivering dough batches and the like, comprising a structure having concentric circular passages, one being a dough supply passage and the other being a piston cylinder, a piston in said cylinder, means to reciprocate said piston, and a stationary delivery throat in alignment with said concentric parts, substantially as described.

CHARLES E. CARPENTER.